US012761390B2

(12) United States Patent
Glenn

(10) Patent No.: US 12,761,390 B2
(45) Date of Patent: Oct. 13, 2026

(54) SUBSEA VEHICLE WITH FLOODED CONNECTOR DETECTION SYSTEM

(71) Applicant: Oceaneering International, Inc., Houston, TX (US)

(72) Inventor: Casey Glenn, Stavanger (NO)

(73) Assignee: Oceaneering International, Inc., Houston, TX (US)

( * ) Notice: Subject to any disclaimer, the term of this patent is extended or adjusted under 35 U.S.C. 154(b) by 413 days.

(21) Appl. No.: 18/412,103

(22) Filed: Jan. 12, 2024

(65) Prior Publication Data

US 2024/0241282 A1 Jul. 18, 2024

Related U.S. Application Data

(60) Provisional application No. 63/438,708, filed on Jan. 12, 2023.

(51) Int. Cl.
*G01V 3/04* (2006.01)

(52) U.S. Cl.
CPC .................................... *G01V 3/04* (2013.01)

(58) Field of Classification Search
CPC ........ H02H 1/003; H02H 1/0076; H02H 1/04; H02H 3/167; H02H 3/32; H02H 3/36; H02H 3/16; H02H 3/17; H02H 3/26; H02H 9/04; H02H 9/045
USPC ................. 324/71.1, 691, 693; 340/604, 618
See application file for complete search history.

(56) References Cited

U.S. PATENT DOCUMENTS

2010/0156435 A1* 6/2010 Kangas .................... G05B 9/02 324/538

* cited by examiner

*Primary Examiner* — Alesa Allgood
*Assistant Examiner* — Rahul Maini
(74) *Attorney, Agent, or Firm* — Maze IP Law, P.C.

(57) ABSTRACT

Presence of water may be detected in internal circuitry of a subsea vehicle by measuring a change in resistance across two terminals to detect the presence of water using a interlock detection system comprising a plurality of voltage sources, connected to a ground, a predetermined set of connectors; an electrical conduit operatively connected to the predetermined set of connectors; an interlock detector comprising an analog circuit and an interlock electrical conduit as well as a first terminal and a second terminal; and a control system. Resistance is measured across the first and second terminals to detect presence of water proximate the first and second terminals, electrical faults, or lack of electrical faults where the measured resistance will equate to a predetermined voltage to be interpreted by the control system. A change in resistance measured across the first and second terminals aids in detection of the presence of water proximate the first and second terminals where the measured change in resistance may be used to detect a change in a state of the end device and the detected change used to effect controlling power to the end device.

16 Claims, 3 Drawing Sheets

SUBSEA VEHICLE WITH FLOODED CONNECTOR DETECTION SYSTEM

RELATION TO OTHER APPLICATIONS

This application claims priority through U.S. Provisional Application 63/438,708 filed on Jan. 12, 2023.

BACKGROUND

The internal components of a subsea vehicle typically include multiple electronic connectors. Since the subsea vehicle is meant to be driven under subsea conditions having high hydrostatic pressure, under these conditions electronic connectors tend to malfunction if water seeps into internal circuits of the electronic connectors. Thus, a system is required to detect the presence of water in the internal circuitry of the subsea vehicle which protects internal components/connectors of the subsea vehicle from short circuit or damage due to seepage of water in the internal components.

Subsea vehicles tend to maneuver in a subsea environment where the conditions are very different with respect to, e.g., working conditions encountered by automobiles, where the conditions may include hydrostatic pressure and temperature. Thus, appliances/components which are normally used in day-to-day life tend to fail under harsh subsea conditions which makes such appliances/components unusable for direct use in a subsea vehicle.

FIGURES

Various figures are included herein which illustrate aspects of embodiments of the disclosed inventions.

FIG. 2 is a schematic view of an exemplary system with a device plugged in;

DESCRIPTION OF EXEMPLARY EMBODIMENTS

The disclosed invention comprises interlock detection system 1 (FIG. 1) useful for detecting flooding of connector for a subsea vehicle, e.g., remotely operated vehicle 400, by measuring a change in resistance across two terminals to detect the presence of water. Typically, interlock detection system 1 comprises a voltage divider circuit, e.g., an analog circuit, which measures a fixed resistance value at end device 20 to aid in controlling power to end device 20, e.g., if the fixed resistance measurement changes, from particular value, e.g., 0 ohms, all the way up to infinite ohms, interlock detection system 1 captures the change in the resistance.

Figure 1:
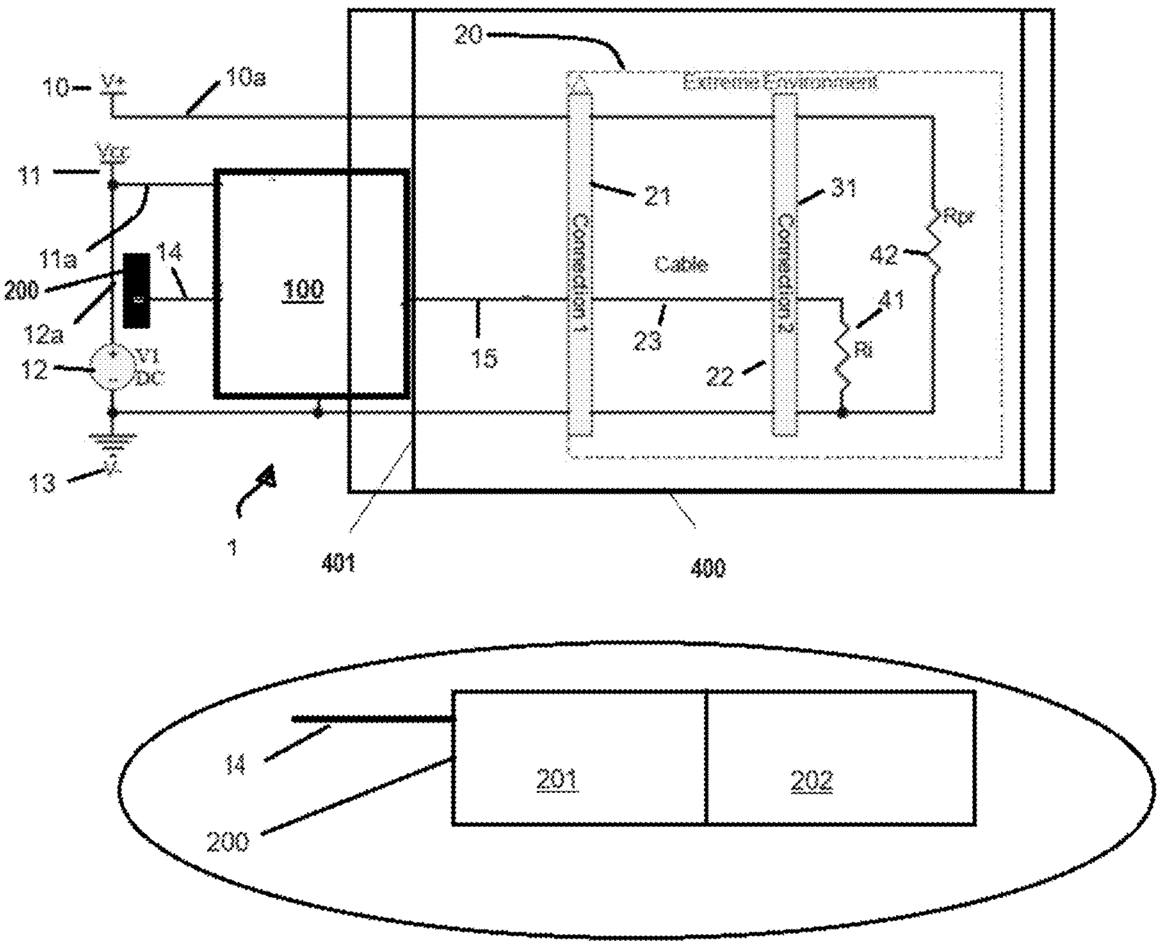
FIG. 1 is a schematic view of an exemplary system.

In a first embodiment, referring generally to FIG. 1, interlock detection system 1 may be used to detect the presence of water in internal circuitry of subsea vehicle 100 by measuring a change in resistance across two terminals to detect the presence of the water. In a first embodiment, interlock detection system 1 comprises first voltage source 12 operatively connected to ground 13 and to first reference voltage 11; second voltage source 10 operatively connected to ground 13; a predetermined set of connectors 21, 31 operatively connected to second voltage source 10 and ground 13; electrical conduit 23 operatively connected to the predetermined set of connectors 21, 31; interlock detector 100 operatively connected to electrical conduit 23 and to first voltage source 12; and control system 200 operatively in communication with interlock detector 100 via interlock signal conduit 14.

Figure 2:
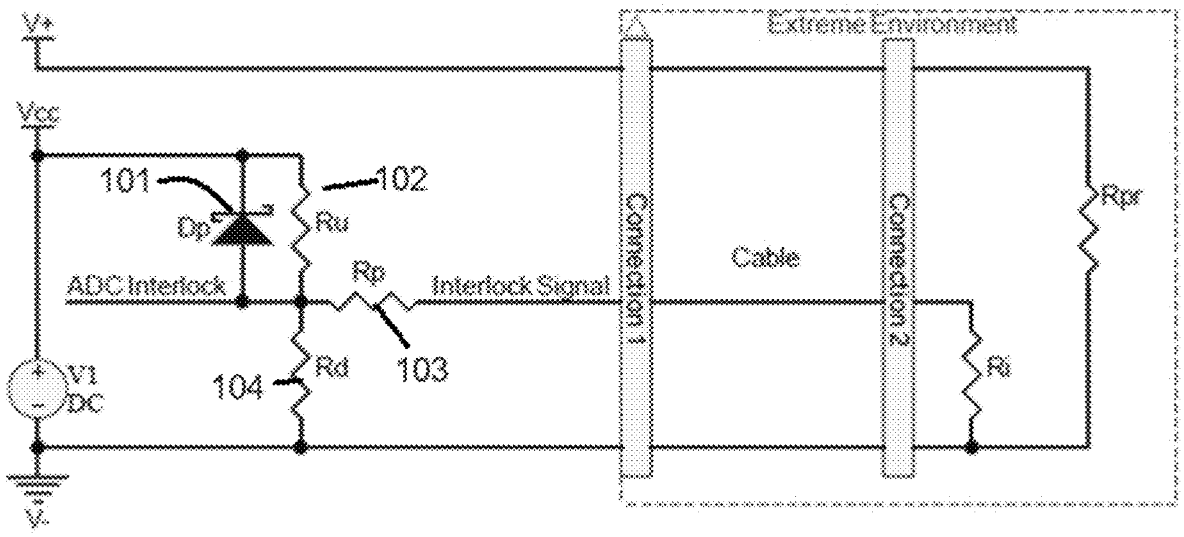
Figure 3:
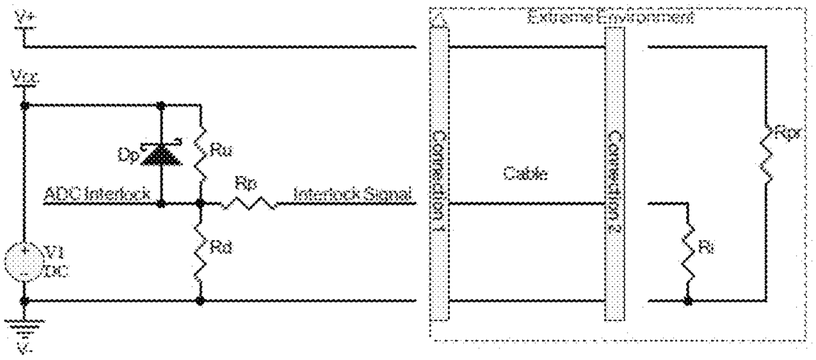
FIG. 3 is a schematic view of an exemplary system with a device un-plugged, e.g., disconnected.
Figure 4:
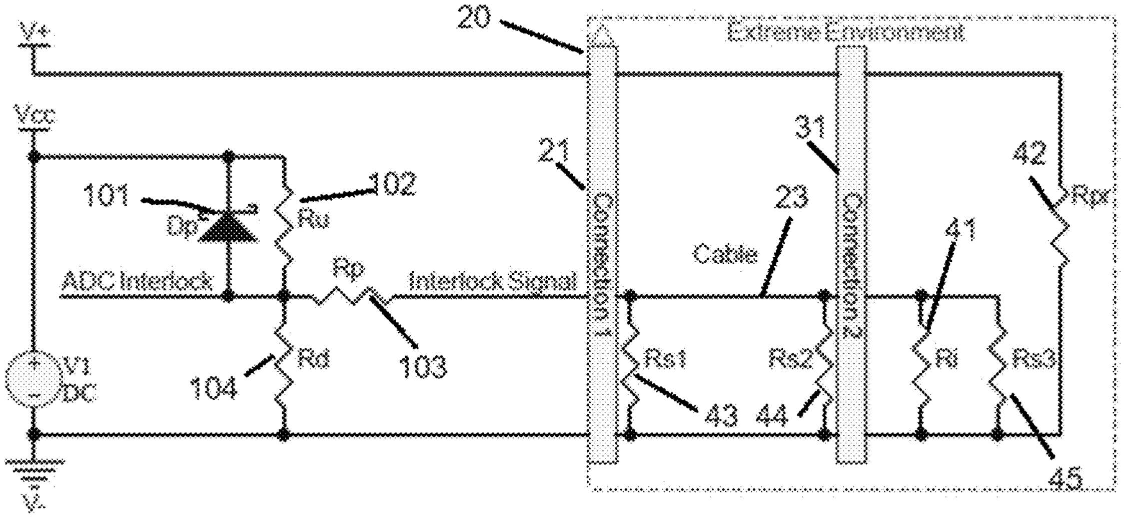
FIG. 4 is a schematic view of an exemplary system with a device shorted low.
Figure 5:
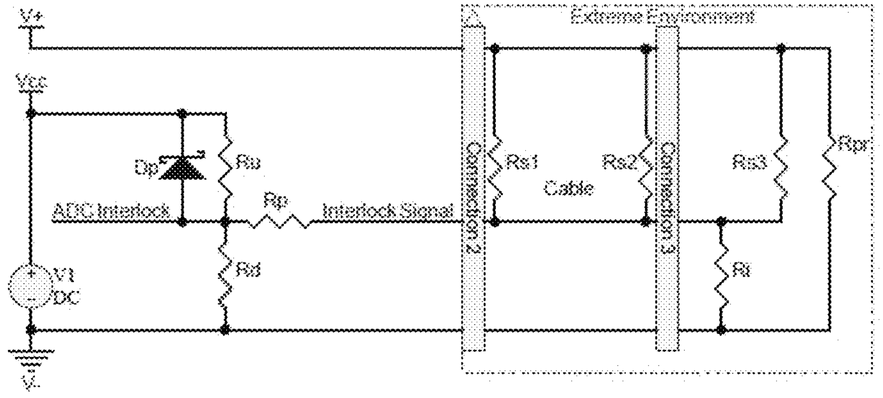
FIG. 5 is a schematic view of an exemplary system with a device shorted high.

In an embodiment, referring additionally to FIG. 4, interlock detector 100 comprises analog circuit 101,102,103,104 (FIG. 2); interlock electrical conduit 15 operatively connected to the analog circuit and to the electrical conduit 23; first terminal 41 operatively connected to the analog circuit and to the ground 13 and comprising a first predetermined resistance; and second terminal 42 operatively connected to the second voltage source 10 and to the ground 13 and comprising a second predetermined resistance.

In embodiments, an interlock being open indicates that nothing is attached or that it is shorted to a positive voltage. In embodiments, analog circuit 100, if shorted to the ground 13, indicates a flooded connector 21,31 (FIG. 4) and, if not shorted to the ground, indicates a normal state. The analog circuit may further comprise voltage divider circuit 101,102,103,104 adapted to measure a fixed resistance value at an end device, e.g., end device 20 (FIG. 1).

Control system 200 typically comprises an intelligent power and ethernet Module (iPEM) comprising tuned precision voltage divider circuit 201 and sixteen effective number of bits (ENOB) analog-to-digital (ADC) circuit 202 to detect a plurality of discreet states. The plurality of discreet states typically comprises a connected state, a disconnected state, a shorted low state, and a shorted high state.

Typically, interlock detection system 1 utilizes a larger voltage margin between discreet states than what interlock detection system 1 typically uses because interlock detection system 1 only uses a single wire and negative return and not a differential pair (Kelvin circuit) for detection and is therefore more susceptible to noise and DC bias from a voltage drop on the current carrying line. These embodiments also tend to reduce overall pin count used in cables and connectors as interlock detection. Large shorting voltages, up to 800 VDC on second voltage source 10, may be handled with interlock detection system 1's circuit design. This typically allows the interlock signal present at interlock signal conduit 14 to survive relatively catastrophic events in which it could be exposed.

Typically, the iPEM is used as a control system with end device 20 being plugged in via external cables and connectors with a pre-chosen resistor of predetermined value. When end device 20 is plugged in with no other faults, this predetermined value will report a certain voltage to be interpreted by ADC circuit 202.

In embodiments, if the resistance changes from a first predetermined resistance value through and up to a second predetermined resistance value, interlock detection system 1 captures the change in the resistance.

In the operation of exemplary methods, referring back to FIG. 1, presence of water in internal circuitry of subsea vehicle 400 may be detected by measuring a change in resistance across two terminals, e.g., first and second terminals 41,42 (FIG. 4), to detect the presence of water. In an embodiment, interlock detection system 1 is installed in or proximate to a subsea vehicle such as remotely operated vehicle (ROV) where interlock detection system 1 is as described above. Resistance is measured across first and second terminals 41,42 (FIG. 4) to detect presence of water such as in ROV or in an ROV component, e.g., bottle or equipment housing 401, and/or faults or lack of faults such that when end device 20 is plugged in with no other faults, the measured resistance will equate to a predetermined voltage to be interpreted by ADC 202. A change in resistance across first and second terminals 41,42 is measured, e.g., by using ADC 202, to detect presence of water proximate predetermined set of connectors 21,31 and the measured change in resistance used to detect a change in a state of end device 20. The detected change may also be used to effect controlling power to end device 20 such as by shutting off power if end device 20 is detected to have become unplugged, if water ingress with respect to end device 20 is detected, if end device 20 is detected to have become unplugged (e.g., first connector 21 from second connector 31) and water ingress with respect to end device 20 is detected, or the like, or a combination thereof.

In embodiments, measuring the change in resistance across two terminals to detect the presence of water comprises, under normal operating conditions, using first voltage source 12 to generate a DC voltage over pull-up resistor 102 and pull-down resistor 104, applying the generated DC voltage as a DC bias voltage to an analog-to-digital converter (ADC) voltage signal present at interlock signal conduit 14; biasing the ADC voltage signal down through protection resistor 103 and interlock resistor 41; and using current through power resistor 42 caused by voltage between second voltage source 10 and ground 13 to affect voltage read by the ADC voltage signal.

In embodiments, analog circuit 101,102,103,104 comprises pull-up resistor 102 comprising a first predetermined voltage and pull-down resistor 104 comprising a second predetermined voltage. In such embodiments, when there is no end device 20 connected and interlock signal 15 is left floating, second voltage source 10 maybe used to generate a DC voltage across pull-up resistor 102 and pull-down resistor 104 and the DC voltage applied as a DC bias voltage applied to an analog-to-digital converter (ADC) voltage signal read by control system 200 via interlock signal conduit 14.

In embodiments, first terminal 41 comprises an interlock resistor which can be disconnected from interlock detection system 1 via disconnection of electrical conduit 23 (FIG. 1) such as by first connector 21 of the predetermined set of connectors 21,31 and second connector 31 of the predetermined set of connectors 21,31, due to an internal disconnection within end device 20 of electrical components which are down circuit from second connector 31.

In embodiments, analog circuit 101,102,103,104 comprises pull-up resistor 102 across which a first predetermined voltage is present and pull-down resistor 104 across which a second predetermined voltage is present. In these embodiments, first voltage source 12 maybe used to generate a DC voltage over pull-up resistor 102 and pull-down resistor 104 and an ADC interlock signal present at interlock signal conduit 14 is pulled to a low voltage via ground 13 due to a short somewhere downstream of the ADC interlock signal. Typically, the short occurs at first short resistor 43 which is operatively connected intermediate first connector 21 of the predetermined set of connectors 21,31 and ground 13; at electrical conduit 23; at second short resistor 44 (FIG. 4) which is operatively connected intermediate second connector 31 of the predetermined set of connectors 21,31 and ground 13; or at third short resistor 45 which is operatively connected intermediate end device 20 and ground 13.

In certain embodiments, analog circuit 101,102,103,104 comprises pull-up resistor 102 across which first predetermined voltage is present and pull-down resistor 104 across which a second predetermined voltage is present. In these embodiments, first voltage source 12 maybe used to generate a DC voltage across pull-up resistor 102 and pull-down resistor 104 and an ADC interlock signal present at interlock signal conduit 14 maybe pulled to a voltage via second voltage source 10 due to a short somewhere downstream of the ADC interlock signal and bias voltage on the ADC interlock signal line from a relatively high resistance of interlock resistor 41 pulling it down. The short typically occurs at first short resistor 43 which is operatively connected intermediate first connector 21 of the predetermined set of connectors 21,31 and ground 13; at the electrical conduit 23 (FIG. 4); at second short resistor 44 which is operatively connected intermediate second connector 31 of the predetermined set of connectors 21,31 and ground 13; or at third short resistor 45 which is operatively connected intermediate end device 20 and ground 13.

In embodiments, interlock detector 100 further comprises protection diode 101 (FIG. 4) operatively connected to first voltage source 12 and interlock signal conduit 14, pull-up resistor 102 operatively connected to protection diode 101, and protection resistor 103 operatively connected to protection diode 101 and pull-up resistor 102. In these embodiments, protection resistor 103 may be used to lower total current flowing into interlock signal 23 and using protection diode 101 to clamp voltage to $V_{cc}$ rail 11*a* (FIG. 1).

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. An interlock detection system to detect presence of water in internal circuitry of a subsea vehicle, comprising:

a) a first voltage source operatively connected to a ground and to a first reference voltage;

b) a second voltage source operatively connected to the ground;

c) a predetermined set of connectors operatively connected to the second voltage source and the ground;

d) an electrical conduit operatively connected to the predetermined set of connectors;

e) an interlock detector operatively connected to the electrical conduit and to the first voltage source, the interlock detector comprising:

i) an analog circuit;

ii) an interlock electrical conduit operatively connected to the analog circuit and to the electrical conduit;

iii) a first terminal operatively connected to the analog circuit and to the ground and comprising a first predetermined resistance; and iv) a second terminal operatively connected to the second voltage source and to the ground and comprising a second predetermined resistance; and f) a control system operatively in communication with the interlock detector via an interlock signal conduit.

2. The interlock detection system to detect the presence of water in the internal circuitry of the subsea vehicle of claim 1, wherein the analog circuit indicates a flooded connector, if shorted to the ground, and indicates a normal state, if not shorted to the ground.

3. The interlock detection system to detect the presence of water in the internal circuitry of the subsea vehicle of claim 1, wherein the analog circuit comprises a voltage divider circuit adapted to measure a fixed resistance value at an end device.

4. The interlock detection system to detect the presence of water in the internal circuitry of the subsea vehicle of claim 1, wherein the control system comprises an intelligent power and ethernet Module (iPEM) comprising:

1. a) a tuned precision voltage divider circuit; and
2. b) a sixteen effective number of bits (ENOB) analog to digital circuit (ADC) operative to detect a plurality of discreet states.

5. The interlock detection system to detect the presence of water in the internal circuitry of the subsea vehicle of claim 4, wherein the plurality of discreet states comprises a connected state, a disconnected state, a shorted low state, and a shorted high state.

6. The interlock detection system to detect the presence of water in the internal circuitry of the subsea vehicle of claim 5, wherein the system utilizes a voltage margin between discreet states resulting from not using a Kelvin circuit for detection.

7. A method of detecting presence of water in internal circuitry of a subsea vehicle by measuring a change in resistance across two terminals to detect the presence of water, comprising:

a) installing an interlock detection system in a subsea vehicle, the system comprising:
   i) a first voltage source operatively connected to a ground and to a first reference voltage;
   ii) a second voltage source operatively connected to the ground;
   iii) a predetermined set of connectors operatively connected to the second voltage source and the ground;
   iv) an electrical conduit operatively connected to the predetermined set of connectors;
   v) an interlock detector operatively connected to the electrical conduit and to the first voltage source, the interlock detector comprising:
      (1) an analog circuit;
      (2) an interlock electrical conduit operatively connected to the analog circuit and to the electrical conduit;
      (3) a first terminal operatively connected to the analog circuit and to the ground and comprising a first predetermined resistance; and
      (4) a second terminal operatively connected to the second voltage source and to the ground and comprising a second predetermined resistance; and
      (5) a control system operatively in communication with the interlock detector via an interlock signal conduit;
b) measuring resistance across the first and second terminals to detect presence of water proximate the first and second terminals, electrical faults, or lack of electrical faults such that when an end device is plugged in with no other electrical faults, the measured resistance will equate to a predetermined voltage to be interpreted by the control system;
c) measuring a change in resistance across the first and second terminals to detect the presence of water proximate the first and second terminals;
d) using the measured change in resistance to detect a change in a state of the end device; and
e) using the detected change to effect controlling power to the end device.

8. The method of claim 7, wherein using the detected change to effect controlling power to the end device comprises shutting off power to the end device if the end device is detected to have become unplugged, if water ingress with respect to the end device is detected, or if the end device is detected to have become unplugged and water ingress with respect to the end device is detected.

9. The method of detecting presence of water in the internal circuitry of the subsea vehicle of claim 7, wherein measuring the change in resistance across the first and second terminals to detect the presence of water comprises:

a) under normal operating conditions, using the first voltage source to generate a DC voltage across a pull-up resistor and a pull-down resistor;
b) applying the generated DC voltage as a DC bias voltage to an analog-to-digital converter (ADC) volt signal via the interlock signal conduit;
c) biasing the ADC volt signal down through a protection resistor and an interlock resistor; and
d) using current through a power resistor from voltage between the second voltage source and the ground to affect voltage read by the ADC volt signal.

10. The method of detecting presence of water in the internal circuitry of the subsea vehicle of claim 7, wherein:

a) the analog circuit comprises a pull-up resistor across which a first predetermined voltage is present and a pull-down resistor across which a second predetermined voltage is present; and
b) when there is no end device connected and an interlock signal present at the interlock electrical conduit is left floating,
   i) using the first voltage source to generate a DC voltage across the pull-up resistor and the pull-down resistor; and
   ii) applying the DC voltage as a DC bias voltage applied to an analog-to-digital converter (ADC) voltage signal read by the control system via the interlock signal conduit.

11. The method of detecting presence of water in the internal circuitry of the subsea vehicle of claim 7, wherein the first terminal comprises an interlock resistor which can be disconnected from the system via disconnection of the electrical conduit, disconnection of the first connector of the predetermined set of connectors from the second connector of the predetermined set of connectors, or an internal disconnection within the end device down circuit from the second connector.

12. The method of detecting presence of water in the internal circuitry of the subsea vehicle of claim 7, wherein the analog circuit comprises a pull-up resistor across which a first predetermined voltage is present and a pull-down resistor across which a second predetermined voltage is present, the method further comprising:

a) using the first voltage source to generate a DC voltage across the pull-up resistor and the pull-down resistor; and
b) pulling an analog-to-digital (ADC) interlock voltage at the interlock signal conduit to a low voltage via the ground due to a short somewhere downstream of the interlock signal conduit.

13. The method of detecting presence of water in the internal circuitry of the subsea vehicle of claim 12, wherein the short occurs at a first short resistor operatively connected intermediate the first connector of the predetermined set of connectors and the ground, at the electrical conduit, at a second short resistor operatively connected intermediate a second connector of the predetermined set of connectors and the ground, or at a third short resistor operatively connected intermediate the end device and the ground.

14. The method of detecting presence of water in the internal circuitry of the subsea vehicle of claim 7, wherein:

a) the analog circuit comprises a pull-up resistor across which a first predetermined voltage is present and a pull-down resistor across which a second predetermined voltage is present;

b) using the first voltage source to generate a DC voltage across the pull-up resistor and the pull-down resistor; and c) pulling an ADC interlock signal present at the interlock signal conduit to a voltage via the second voltage source due to a short somewhere downstream of the ADC interlock signal and a bias voltage on the interlock signal conduit from a relatively high resistance of the interlock resistor pulling it down towards ground.

15. The method of detecting presence of water in the internal circuitry of the subsea vehicle of claim 14, wherein the short occurs at a first short resistor operatively connected intermediate a first connector of the predetermined set of connectors and the ground, at the electrical conduit, at a second short resistor operatively connected intermediate a second connector of the predetermined set of connectors and the ground, or at a third short resistor operatively connected intermediate the end device and the ground.

16. The method of detecting presence of water in the internal circuitry of the subsea vehicle of claim 12, wherein the interlock detector further comprises a protection diode operatively connected to the first voltage source and the interlock signal conduit, the pull-up resistor operatively connected to the protection diode, and a protection resistor operatively connected to the protection diode and the pull-up resistor, the method further comprising:

a) using the protection resistor to lower total current flowing into an interlock signal; and b) using the protection diode to clamp voltage to a $V_{cc}$ rail.

* * * * *